US009964912B2

(12) United States Patent
Tomimatsu

(10) Patent No.: US 9,964,912 B2
(45) Date of Patent: May 8, 2018

(54) VOLTAGE REGULATOR AND IMAGE FORMING APPARATUS THAT EQUALIZE REQUIRED VOLTAGE OF A PLURALITY OF CORES INCLUDED IN INTEGRATED CIRCUIT

(71) Applicant: Kyocera Document Solutions Inc., Osaka (JP)

(72) Inventor: Tetsuo Tomimatsu, Osaka (JP)

(73) Assignee: Kyocera Document Solution Inc., Osaka (JP)

( * ) Notice: Subject to any disclaimer, the term of this patent is extended or adjusted under 35 U.S.C. 154(b) by 100 days.

(21) Appl. No.: 15/253,830

(22) Filed: Aug. 31, 2016

(65) Prior Publication Data

US 2017/0060071 A1 Mar. 2, 2017

(30) Foreign Application Priority Data

Aug. 31, 2015 (JP) ................................ 2015-170819

(51) Int. Cl.
*G03G 15/00* (2006.01)
*H02J 1/00* (2006.01)

(52) U.S. Cl.
CPC ................ *G03G 15/80* (2013.01); *H02J 1/00* (2013.01)

(58) Field of Classification Search
None
See application file for complete search history.

(56) References Cited

U.S. PATENT DOCUMENTS

2012/0100895 A1* 4/2012 Priyantha .......... H04W 52/0293 455/574
2015/0372488 A1* 12/2015 Maruhashi ................ H02J 3/14 700/287

FOREIGN PATENT DOCUMENTS

JP 2002-283666 A 10/2002

* cited by examiner

*Primary Examiner* — Paul J Yen
(74) *Attorney, Agent, or Firm* — James Judge

(57) ABSTRACT

A voltage regulator includes an integrated circuit, a first power supply circuit, and a second power supply circuit. The integrated circuit includes a first core through which passage of current is continued in a power-saving mode, and a second core through which passage of current is halted in the power-saving mode. A determination unit determines whether operational status of the second core is a predetermined state that increases consumed current of the second core. A detecting unit detects a second DC voltage output from the second power supply circuit when the determination unit determines the operational status of the second core to be the predetermined state. A voltage adjusting unit adjusts the second DC voltage such that difference in voltage between the detected second DC voltage and a required voltage of the second core is equal to or less than a predetermined specified voltage difference.

6 Claims, 9 Drawing Sheets

| DC Voltage | Required Voltage | Minimum Voltage | Maximum Voltage |
|---|---|---|---|
| V1 | 1. 1V | 1. 0V | 1. 2V |
| V2 | 1. 1V | 1. 0V | 1. 2V |

| Status to increase current consumption | ST |
| --- | --- |
| Required time for printing process is equal to or more than 10 minutes | ST1 |
| Data amount of image data is equal to or more than 10 M | ST2 |
| Continuous printing is performed equal to or more than 10 times | ST3 |

*FIG. 9*

| V2 | O1 | O2 | Determination result |
|---|---|---|---|
| V2>VU | H | L | Voltage difference is greater than specified voltage difference |
| VU≥V2>VL | L | L | Voltage difference is equal to or smaller than specified voltage difference |
| VL≥V2 | L | H | Voltage difference is greater than specified voltage difference |

VOLTAGE REGULATOR AND IMAGE FORMING APPARATUS THAT EQUALIZE REQUIRED VOLTAGE OF A PLURALITY OF CORES INCLUDED IN INTEGRATED CIRCUIT

INCORPORATION BY REFERENCE

This application is based upon, and claims the benefit of priority from, corresponding Japanese Patent Application No. 2015-170819 filed in the Japan Patent Office on Aug. 31, 2015, the entire contents of which are incorporated herein by reference.

BACKGROUND

Unless otherwise indicated herein, the description in this section is not prior art to the claims in this application and is not admitted to be prior art by inclusion in this section.

Recently, a system-on-a-chip (SOC) that includes a core always energized and a core where the energization is cutoff in an energy saving mode has been known. To realize this SOC, it is necessary to individually locate a DC/DC converter corresponding to each core to individually supply a DC voltage to each core. In this case, depending on the SOC, a specification is sometimes imposed that required voltages of the cores should be equal and a voltage difference between the DC voltages supplied to the cores should be equal to or less than a predetermined threshold.

Therefore, to satisfy the specification, an output voltage of each DC/DC converter is regularly detected and the output voltage of each DC/DC converter is sometimes adjusted by a feedback control so as to make the voltage difference between the detected output voltages equal to or less than the predetermined threshold.

For example, a typical printer controller device that includes an A/D converter (voltage value detecting unit) to detect a voltage value of a power source supplied to a device on a printed circuit board of the printer controller and a CPU (control unit) with a considerable high speed and high performance has been disclosed. Then, there is an ON/OFF control of a transistor by the CPU based on the detection result of the A/D converter controls the voltage value of the power source supplied to the device.

SUMMARY

A voltage regulator according to one aspect of the disclosure operates in normal and power-saving modes. The voltage regulator includes an integrated circuit, a first power supply circuit, and a second power supply circuit. The integrated circuit includes a first core through which passage of current is continued in the power-saving mode, and a second core through which passage of current is halted in the power-saving mode. The first power supply circuit generates a first DC voltage supplied to the first core. The second power supply circuit generates a second DC voltage supplied to the second core. A required voltage of the second core is established to be equal to a required voltage of the first core. The integrated circuit includes a determination unit, a detecting unit, and a voltage adjusting unit. The determination unit determines whether operational status of the second core is a predetermined state that increases consumed current of the second core. The detecting unit detects the second DC voltage output from the second power supply circuit when the determination unit determines the operational status of the second core to be the predetermined state. The voltage adjusting unit adjusts the second DC voltage such that difference in voltage between the detected second DC voltage and the required voltage of the second core is equal to or less than a predetermined specified voltage difference.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 9 illustrates a determination result output by the voltage comparator.

DETAILED DESCRIPTION

Figures 1, 2:
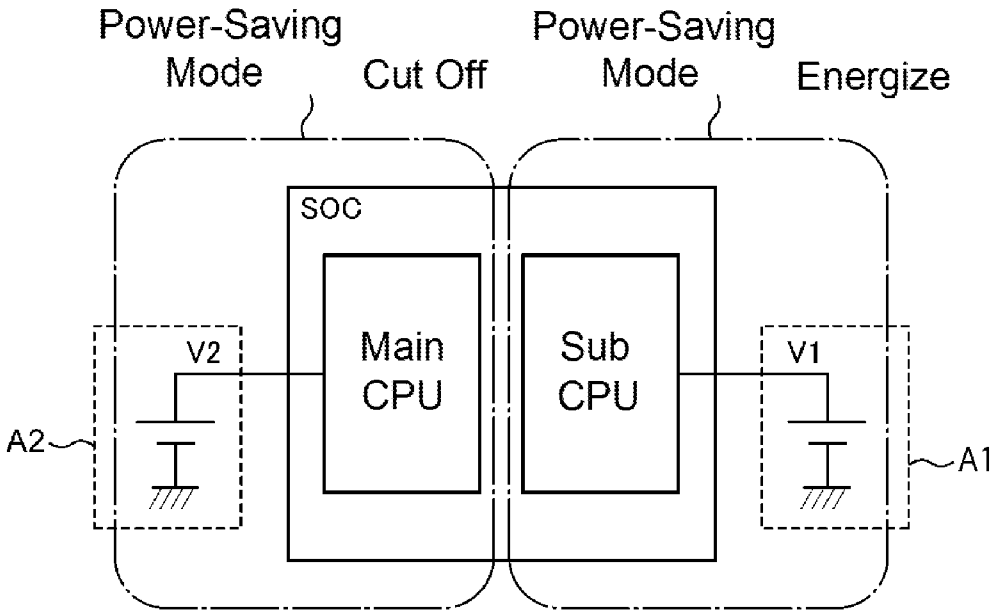
FIG. 1 illustrates an SOC mounted on an electrical device.
FIG. 2 illustrates an exemplary variation of a first DC voltage supplied by a power supply circuit A1 and a second DC voltage supplied by a power supply circuit A2.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

Circumstances Leading to Embodiment of the Disclosure

Recently, many electrical devices such as an image forming apparatus include an SOC. FIG. 1 illustrates the SOC mounted on the electrical device. The SOC includes a main CPU and a sub CPU. In a power-saving mode, electric power is suspended to be supplied to the main CPU that consumes a lot of amount of current to save a power consumption, and only the sub CPU is energized. Then, in the power-saving mode, the sub CPU performs a minimum process such as a packet response on a network. In a normal mode, the electric power is supplied to both the main CPU and the sub CPU.

Thus, when the SOC is used to realize the power-saving mode, since the supply of the electric power to the main CPU is suspended, if a required voltage of the sub CPU and a required voltage of the main CPU are equal, it is necessary to locate power supply circuits A1 and A2 that individually supply a first and a second DC voltages V1 and V2 with an identical volume value to the sub CPU and the main CPU, respectively. As the power supply circuits A1 and A2, DC/DC converters are used.

Here, the power supply circuit A2 that suspends the supply of the second DC voltage V2 to the main CPU in the power-saving mode and the power supply circuit A1 that supplies the first DC voltage V1 to the sub CPU in the power-saving mode have an individual specification. Originally, there is no dependency between the power supply circuits A1 and A2.

FIG. 2 illustrates an exemplary variation of the first DC voltage V1 supplied by the power supply circuit A1 and the second DC voltage V2 supplied by the power supply circuit A2. As illustrated in FIG. 2, the power supply circuits A1 and A2 supply the first and the second DC voltages V1 and V2 that vary within an acceptable voltage range of plus/minus "0.1 V" with respect to the required voltage "1.1 V" required by the sub CPU and the main CPU as the center. That is, the first and the second DC voltages V1 and V2 are allowed to vary within a range of the minimum voltage "1.0 V" to the maximum voltage "1.2 V."

Thus, when the variation exists between the respective first and second DC voltages V1 and V2 output by the power supply circuits A1 and A2, a manufacturer sometimes requires a strict specification where the voltage difference between the first DC voltage V1 and the second DC voltage V2 should be equal to or less than a predetermined threshold (such as, 50 mV).

Figure 3:
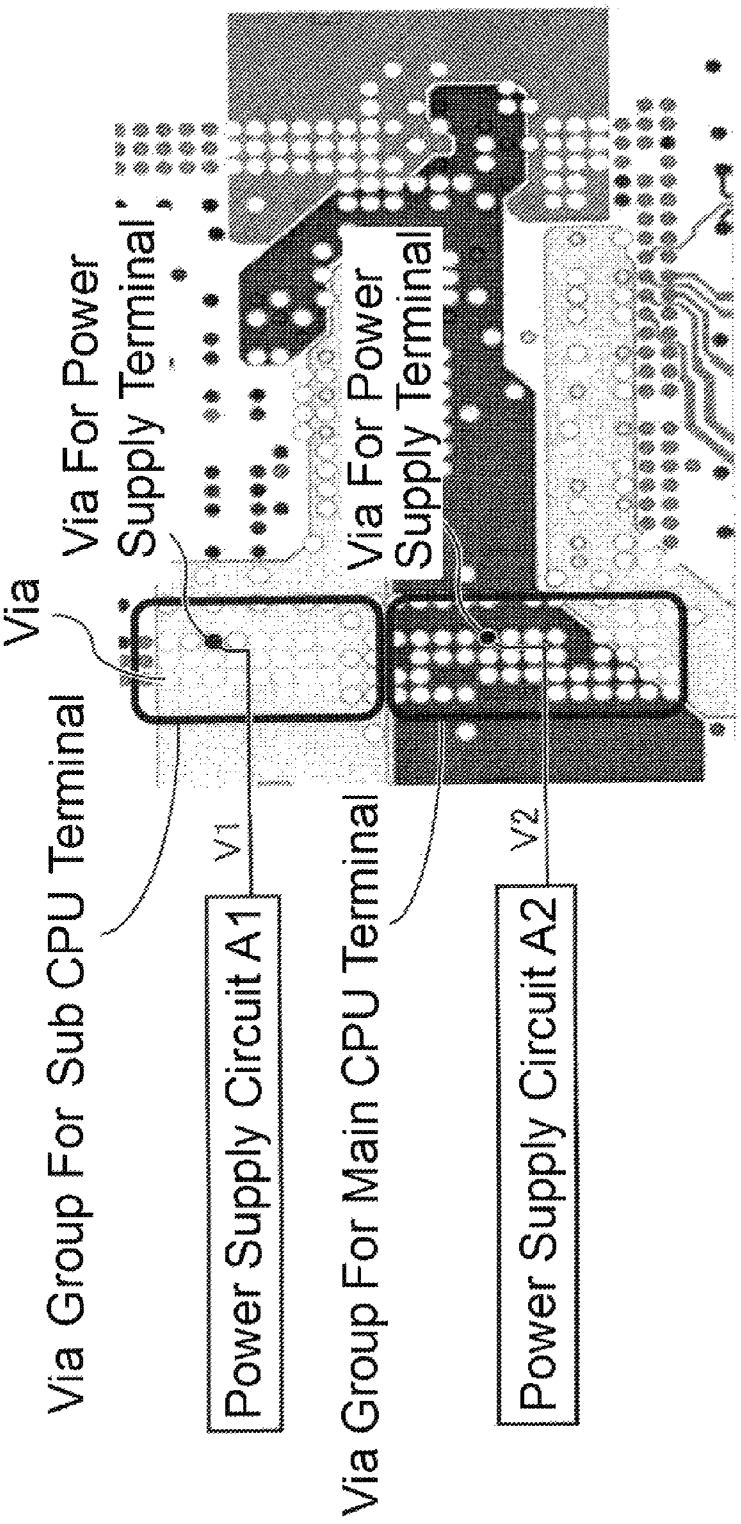
FIG. 3 illustrates an exemplary wiring of a power feeder that connects the power supply circuit A1 to a power supply terminal of a sub CPU, and a power feeder that connects the power supply circuit A2 to a power supply terminal of a main CPU.

FIG. 3 illustrates an exemplary wiring of a power feeder that connects the power supply circuit A1 to a power supply terminal of the sub CPU, and a power feeder that connects the power supply circuit A2 to a power supply terminal of the main CPU. As illustrated in FIG. 3, since many vias are arranged on a substrate where the SOC is located, the power feeders that connect the power supply circuits A1 and A2 to the power supply terminal of each CPU are wired so as to pass through the gaps between the vias, and then, folded toward the power supply terminal of each CPU to be wired. Then, if the amount of current flowing through the power feeder increases, what is called an IR drop is generated at the folded portion where impedance is high, and the first and the second DC voltages V1 and V2 supplied to each CPU may significantly decrease.

Accordingly, if the condition where the main CPU performs an operation with a large consumed current amount compared with the sub CPU occurs, a significant difference between the amounts of decrease of the first and the second DC voltages V1 and V2 caused by the generation of the IR drop occurs, and then, the voltage difference between the first and the second DC voltages V1 and V2 may not be decreased to equal to or less than the predetermined threshold.

Therefore, the embodiment provides a voltage regulator and an image forming apparatus that includes this voltage regulator. The voltage regulator equalizes the required voltage of the main CPU and the required voltage of the sub CPU, and when there is a specification that the voltage difference between the first and the second DC voltages V1 and V2 supplied to each CPU should be equal to or less than the predetermined threshold, the voltage regulator decreases the possibility to violate the specification.

Embodiment

Configuration of Image Forming Apparatus

Figure 4:
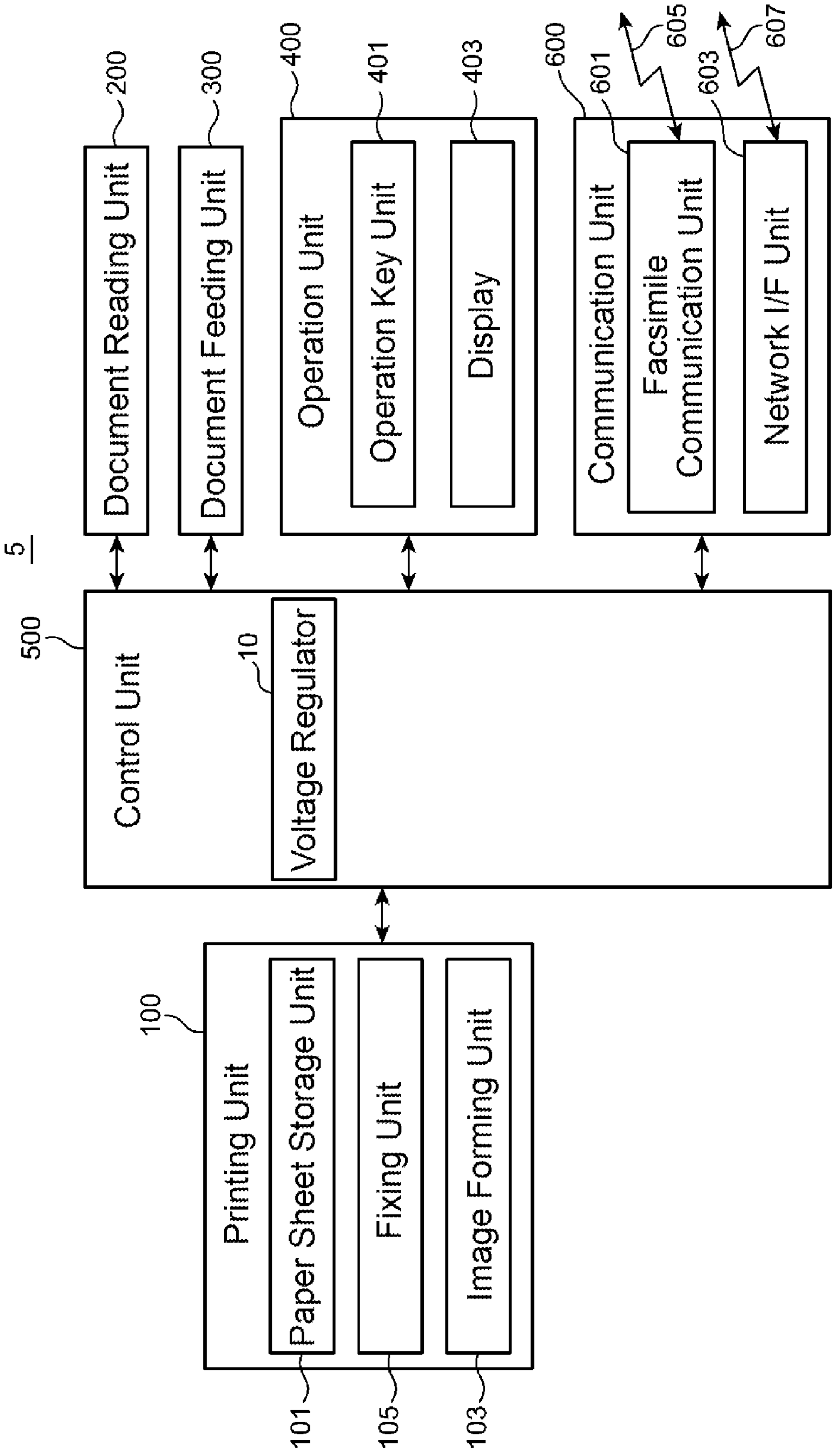
FIG. 4 illustrates a configuration of an image forming apparatus that includes a voltage regulator.

The following describes a voltage regulator and an image forming apparatus according to the embodiment based on the drawings. FIG. 4 illustrates a configuration of an image forming apparatus 5 that includes a voltage regulator 10.

A description will be given of the image forming apparatus 5 with an example of a digital multi-functional peripheral that has functions of a copying machine, a printer, a scanner and a facsimile. It is only necessary that the image forming apparatus 5 is an apparatus with a function to print an image, and the image forming apparatus 5 is not limited to the digital multi-functional peripheral. For example, a printer may be the image forming apparatus 5. The image forming apparatus 5 includes a printing unit 100, a document reading unit 200, a document feeding unit 300, an operation unit 400, a communication unit 600, and a control unit 500.

The document feeding unit 300 performs a document feeding process under the control of the control unit 500. In the document feeding process, when a sheet of document is placed on a document platen located on the document feeding unit 300, the document feeding unit 300 transmits the document to the document reading unit 200, and when a plurality of sheets of document are placed on the document platen, the document feeding unit 300 continuously transmits the plurality of sheets of document to the document reading unit 200.

The document reading unit 200 performs an image reading process under the control of the control unit 500. In the image reading process, the document reading unit 200 reads a document placed on a platen and the document fed from the document feeding unit 300, and outputs image data of the document to the control unit 500.

The printing unit 100 includes a paper sheet storage unit 101, an image forming unit 103, and a fixing unit 105, and performs a printing process to form an image on a paper sheet under the control of the control unit 500.

The paper sheet storage unit 101 can store a bundle of papers. In the printing process, the paper sheet storage unit 101 causes a pickup roller (not illustrated) to drive to deliver a top paper sheet of the stored bundle of papers toward a paper sheet conveyance passage. The paper sheet passes through the paper sheet conveyance passage to be fed to the image forming unit 103.

The image forming unit 103 includes a photoreceptor drum, an exposure unit, a developing device, and a transfer unit. In the printing process, the image forming unit 103 forms a toner image of the image shown by the image data input from the control unit 500 on the paper sheet fed passing through the paper sheet conveyance passage.

The fixing unit 105 includes a heating roller and a pressure roller. In the printing process, the fixing unit 105 performs a heating and applies a pressure on the paper sheet on which the toner image is formed to fix the toner image on the paper sheet.

The operation unit 400 includes an operation key unit 401 and a display 403. The display 403 has a touch panel function, and displays a screen including software keys. The user configures settings required to execute, for example, a copying function by operating the software keys while watching the screen.

The operation key unit 401 includes operation keys constituted of hardware keys. The operation key includes, for example, a start key, a numeric keypad, a reset key, and a function switching key to switch the copying, the printer, the scanner, and the facsimile.

The communication unit 600 includes a facsimile communication unit 601 and a network I/F unit 603. The facsimile communication unit 601 includes network control unit (NCU), which controls the telephone line connection with the other side of the facsimile and a modulation and demodulation circuit, which modulates and demodulates the signal for the facsimile communication. The facsimile communication unit 601 is connected to a telephone line 605.

The network I/F unit 603 is connected to a local area network (LAN) 607. The network I/F unit 603 is a communication interface circuit, which executes communication with a PC connected to the LAN 607.

The control unit 500 manages the control of the entire image forming apparatus 5. The control unit 500 includes the voltage regulator 10 (described below).

Configuration of Voltage Regulator

Figure 5:
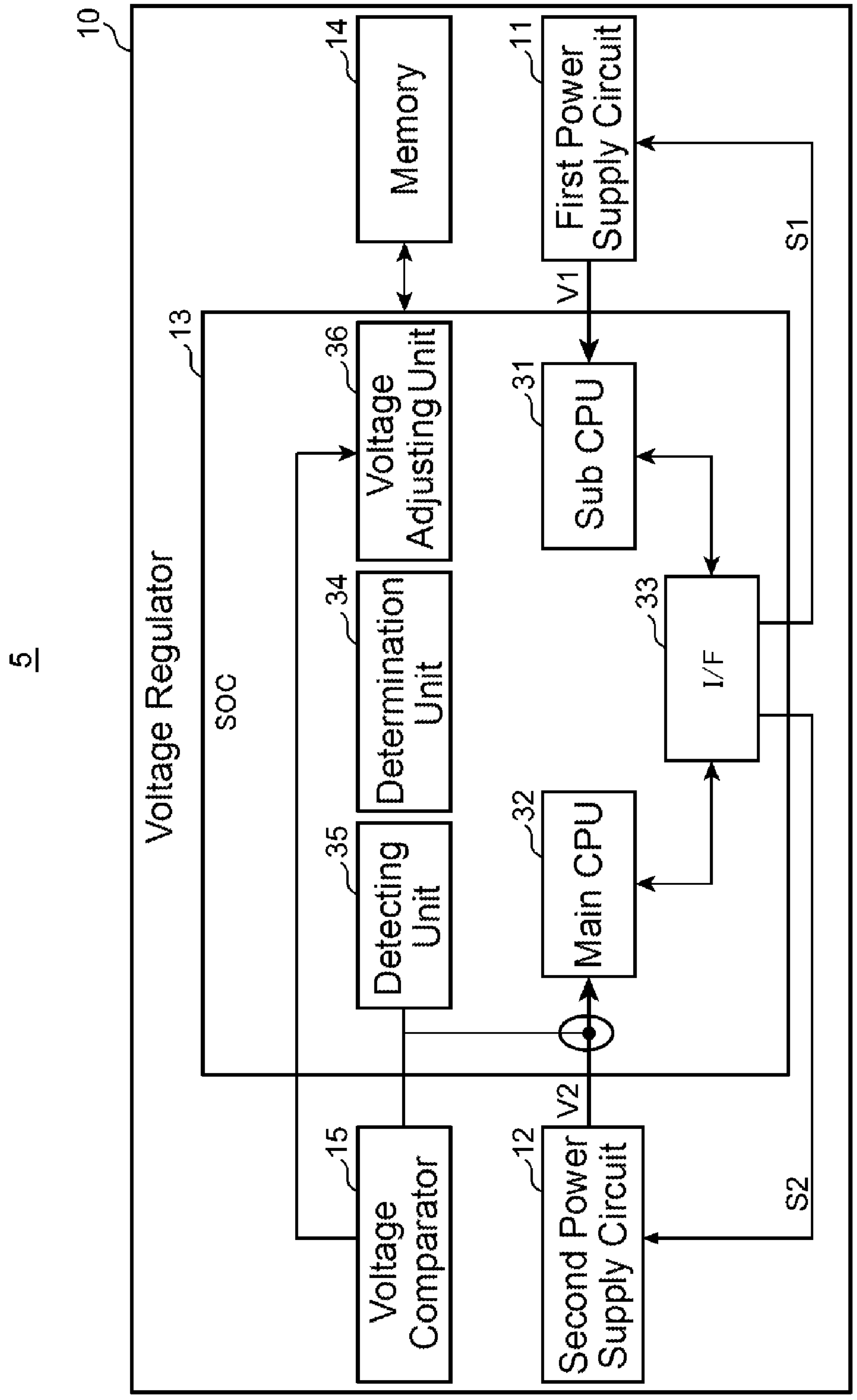
FIG. 5 illustrates an overall configuration of the voltage regulator.

FIG. 5 illustrates an overall configuration of the voltage regulator 10. The voltage regulator 10 includes a first power supply circuit 11, a second power supply circuit 12, a system-on-a-chip (SOC: integrated circuit) 13, a memory 14 (storage unit), and a voltage comparator 15.

The first power supply circuit 11 is configured of such as a DC/DC converter, and generates the first DC voltage V1 that has a voltage value corresponding to a first setting value S1, which is output from the SOC 13, to supply to a sub CPU 31. The second power supply circuit 12 is configured of such as a DC/DC converter, and generates the second DC voltage V2 that has a voltage value corresponding to a second setting value S2, which is output from the SOC 13, to supply to a main CPU 32.

The SOC 13 includes the sub CPU 31 (first core), the main CPU 32 (second core), an interface 33 (hereinafter referred to as "I/F 33"), a determination unit 34, a detecting unit 35, and a voltage adjusting unit 36.

To the sub CPU 31, the first DC voltage V1 is always supplied regardless of whether the image forming apparatus 5 is set in the power-saving mode or the normal mode, and the sub CPU 31 always performs the operation. The power-saving mode is a mode where the electric power supply to some of the electric components among the electric components constituting the image forming apparatus 5 is suspended. The normal mode is a mode where the electric power is supplied to every electric components constituting the image forming apparatus 5.

Here, the sub CPU 31 mainly performs in the power-saving mode. The sub CPU 31 execute such as a process to control the communication unit 600, receive packets transmitted from the outside of the image forming apparatus 5, and response to the packets. The sub CPU 31 controls the image forming apparatus 5 to perform whether in the power-saving mode or in the normal mode.

For example, in the normal mode, if the input from the user has not been accepted for a certain time period, the sub CPU 31 sets the image forming apparatus 5 in the power-saving mode. On the other hand, in the power-saving mode, if the input of a print command from the user has been accepted, the sub CPU 31 sets the image forming apparatus 5 in the normal mode.

When the image forming apparatus 5 is set in the power-saving mode, the supply of the second DC voltage V2 to the main CPU 32 from the second power supply circuit 12 is suspended under the control of the sub CPU 31, and the main CPU 32 goes into a sleep state. When the image forming apparatus 5 is set in the normal mode, the second DC voltage V2 is supplied to the main CPU 32 from the second power supply circuit 12 under the control of the sub CPU 31. Here, for example, the main CPU 32 controls each unit constituting the image forming apparatus 5 in the normal mode to cause each unit to execute various processes (document feeding process, image reading process, printing process, and similar process).

Thus, when the SOC 13 is used to realize the power-saving mode, since the electric power supply to the main CPU 32 is suspended, if the required voltage required by the main CPU 32 and the required voltage required by the sub CPU 31 are determined equal, the first and the second power supply circuits 11 and 12 that individually supply the first and second DC voltages V1 and V2 with the identical voltage value with respect to the sub CPU 31 and the main CPU 32 respectively are located.

The I/F 33 is constituted of such as an I2C interface, and transmits the first setting value S1 to the first power supply circuit 11, the second setting value S2 to the second power supply circuit 12 under the control of the SOC 13. Here, the control of the transmitting and receiving of the first and the second setting value S1 and S2 may be performed by the sub CPU 31 or the main CPU 32.

The determination unit 34 is constituted of such as a different CPU from the main CPU 32 and the sub CPU 31, and determines whether or not the operating status of the main CPU 32 is under a predetermined status to increase the current consumption of the main CPU 32. The determination unit 34 may be configured as a part of the process performed by the main CPU 32 or the sub CPU 31.

The detecting unit 35 is constituted of such as a voltage sensor, and detects the second DC voltage V2 on a position close to the main CPU 32 compared with to the second power supply circuit 12 when the determination unit 34 determines the operating status of the main CPU 32 to be under the predetermined status to increase the current consumption of the main CPU 32. Specifically, the detecting unit 35 is connected to a position (solid line ellipse part in FIG. 5) near the via for the power supply terminal of the main CPU 32 in the power feeder of the second DC voltage V2 (see FIG. 3) to detect the second DC voltage V2 on the position.

The voltage adjusting unit 36 is constituted of such as a different CPU from the main CPU 32 and the sub CPU 31, and adjusts the second DC voltage V2 such that the voltage difference between the second DC voltage V2 detected by the detecting unit 35 and the required voltage of the main CPU 32 is equal to or less than a predetermined specified voltage difference. The voltage adjusting unit 36 may be configured as a part of the process performed by the main CPU 32 or the sub CPU 31.

The memory 14 is constituted of such as a rewritable non-volatile storage device. The memory 14 stores default of the first and the second setting values S1 and S2. The defaults of the first and the second setting values S1 and S2 are determined to values corresponding to the required voltages of the sub and main CPUs 31 and 32. When the required voltage of the main CPU 32 and the required voltage of the sub CPU 31 are determined to be equal, the defaults of the first and the second setting values S1 and S2 have the identical value.

The defaults of the first and the second setting values S1 and S2 stored in the memory 14 are read out by the first and the second power supply circuits 11 and 12 via the SOC 13 when the voltage regulator 10 is activated. This causes the first and the second power supply circuits 11 and 12 to generate the first and the second DC voltages V1 and V2 identical to the required voltages of the sub and main CPUs 31 and 32 according to the defaults of the first and the second setting values S1 and S2.

The voltage comparator 15 is connected to a position (solid line ellipse part in FIG. 5) where the detecting unit 35 detects the second DC voltage V2. The voltage comparator 15 outputs the determination result of whether or not the voltage difference between the second DC voltage V2 at the detecting position and the required voltage of the main CPU 32 is equal to or less than the specified voltage difference to the voltage adjusting unit 36. That is, the voltage comparator 15 outputs the determination result of whether or not the voltage difference between the second DC voltage V2 detected by the detecting unit 35 and the required voltage of the main CPU 32 is equal to or less than the specified voltage difference to the voltage adjusting unit 36.

Performance of Voltage Regulator

Figure 6:
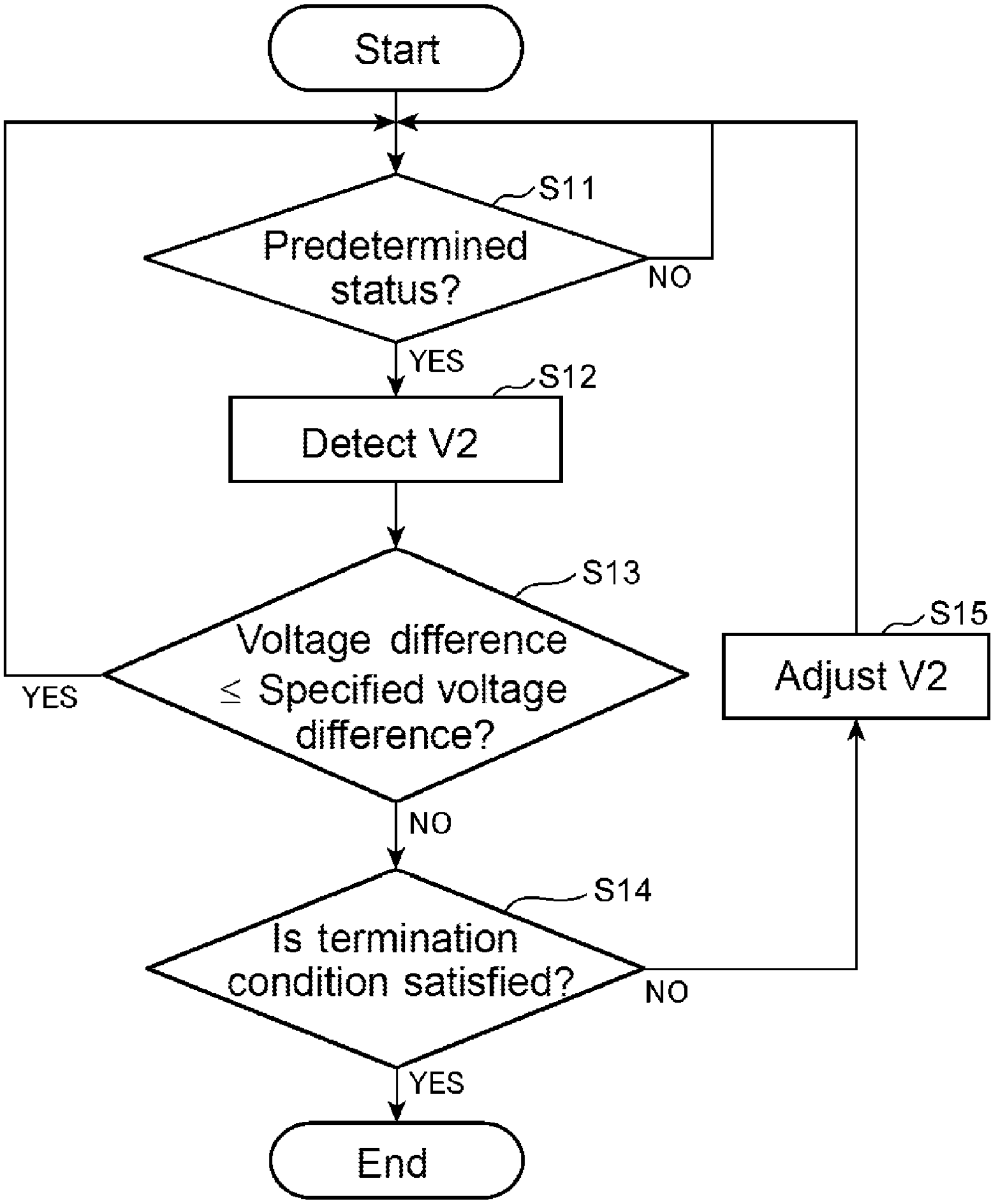
FIG. 6 illustrates a performance of the voltage regulator.

FIG. 6 indicates a performance of the voltage regulator 10. Assume that, when this flowchart is started, as described above, the first and the second power supply circuits 11 and 12 generate the first and the second DC voltages V1 and V2 identical to the required voltages of the sub CPU 31 and the main CPU 32 according to the defaults of the first and the second setting values S1 and S2 stored in the memory 14 to supply to the sub CPU 31 and the main CPU 32. Also assume that the image forming apparatus 5 is set in the normal mode, and the main CPU 32 controls each unit constituting the image forming apparatus 5 to execute various processes.

First, the determination unit 34 determines whether or not the operating status of the main CPU 32 is under the predetermined status to increase the current consumption of the main CPU 32 (Step S11). When the determination unit 34 determines the operating status of the main CPU 32 to be the predetermined status to increase the current consumption of the main CPU 32 (YES in Step S11), the process proceeds to Step S12. On the other hand, when the determination unit 34 determines the operating status of the main CPU 32 not to be the predetermined status to increase the current consumption of the main CPU 32 (NO in Step S11), the process returns to Step S11.

In Step S12, the detecting unit 35 detects the second DC voltage V2 (Step S12).

Next, in Step S13, the voltage comparator 15 outputs the determination result of whether or not the voltage difference between the second DC voltage V2 detected in Step S12 and the required voltage of the main CPU 32 is equal to or less than the specified voltage difference to the voltage adjusting unit 36. When the input determination result indicates that the voltage difference is equal to or less than the specified voltage difference (YES in Step S13), the voltage adjusting unit 36 returns the process to Step S11. On the other hand, when the input determination result indicates that the voltage difference is greater than the specified voltage difference (NO in Step S13), the voltage adjusting unit 36 advances the process to Step S14.

When a termination condition is not satisfied in Step S14 (NO in Step S14), the voltage adjusting unit 36 adjusts the second DC voltage V2 (Step S15), and returns the process to Step S11. On the other hand, when the termination condition is satisfied (YES in Step S14), the process is terminated. Here, as the termination condition, such as a case where the number of the adjustment of the second DC voltage V2 in Step S15 has reached a predetermined upper limit value corresponds to the termination condition. In this case, the process is determined that the voltage difference fails to be decreased to equal to or less than the specified voltage difference, and the process is terminated.

Detail of Determination by Determination Unit 34

The following describes the determination by the determination unit 34 in Step S11 in detail. The main CPU 32 stores what is called an event log that indicates the operating status of the main CPU 32 itself in such as a RAM (not illustrated) in the SOC 13 in time series associating with a time.

For example, when the main CPU 32 performs an operation that causes the printing unit 100 to execute a printing process, the main CPU 32 stores the event log that indicates the operating statuses such as the start of the printing process, the output of the image data to the printing unit 100, the output of the printed paper sheet, and the termination of the printing process in the time series associating with the time. The event log that indicates the output of the image data to the printing unit 100 includes information that indicates the data amount of the image data. The event log that indicates the output of the printed paper sheet includes information that indicates the number of the output of the printed paper sheet.

Figures 7, 8:
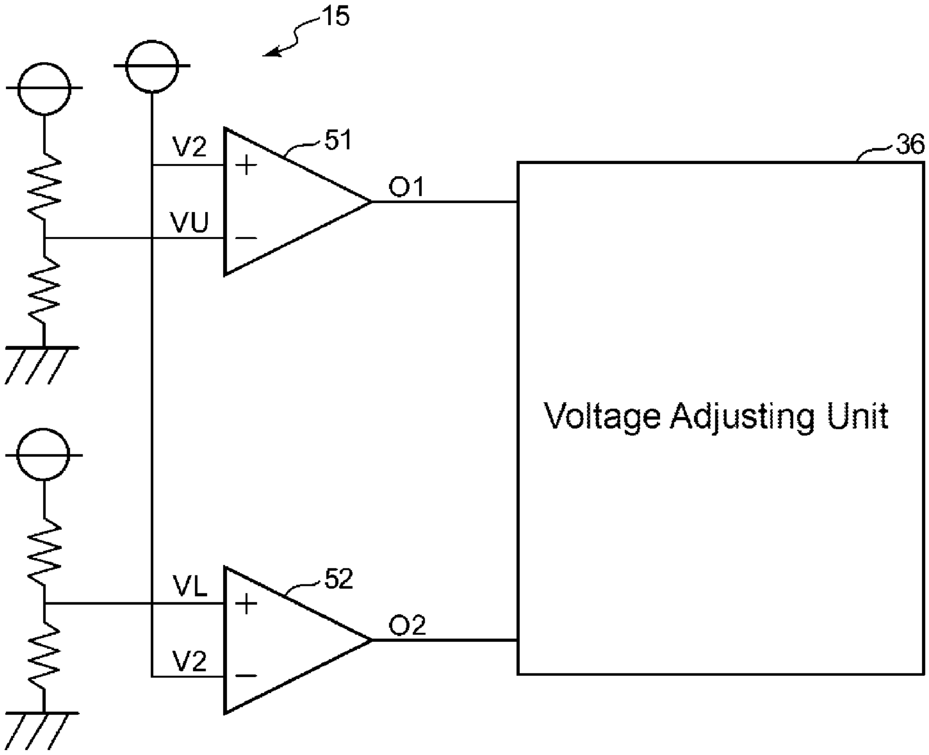
FIG. 7 illustrates an exemplary status table.
FIG. 8 illustrates a circuit configuration of a voltage comparator in detail.

The memory 14 preliminarily stores a status table ST (status information) that indicates a status to increase the current consumption of the main CPU 32. FIG. 7 illustrates an exemplary status table ST. In the status table ST in FIG. 7, a status ST1 where a required time for the printing process that the main CPU 32 causes the printing unit 100 to perform is equal to or more than 10 minutes, a status ST2 where the data amount of the image data used for the printing process is equal to or more than 10 M, and a status ST3 where the printing process to output the paper sheet equal to or less than a predetermined number of the sheet is continuously performed equal to or more than 10 times are determined as the status to increase the current consumption of the main CPU 32.

Therefore, the determination unit 34 determines whether or not the operating status of the main CPU 32 obtained based on each event log, which is stored in such as the RAM, in the determination of Step S11 is included in each status indicated by the status table ST.

For example, the determination unit 34 calculates an elapsed time passed from the time associated with the event log indicating the start of the latest printing process. This ensures the determination unit 34 to obtain the required time for the printing process that is caused to execute by the main CPU 32. Then, when the obtained required time for the printing process is equal to or more than 10 minutes, the determination unit 34 determines that the operating status of the main CPU 32 is included in the status ST1 indicated by the status table ST.

The determination unit 34 also refers to the event log indicating the latest output of the image data to the printing unit 100. Then, the determination unit 34 obtains the data amount of the image data used for the printing process that is caused to execute by the main CPU 32 based on the information indicating the data amount of the image data included in the referred event log. Then, when the obtained data amount of the image data is equal to or more than 10 M, the determination unit 34 determines that the operating status of the main CPU 32 is included in the status ST2 indicated by the status table ST.

The determination unit 34 also refers to the event log sequentially indicating the output of the printed paper sheet going back from the event log indicating the latest output of the printed paper sheet. Then, the determination unit 34 obtains how many times the main CPU 32 causes the printing process of equal to or less than the predetermined number of sheets to be continuously performed based on the information indicating the number of the output of the printed paper sheet included in each of the referred event log. The predetermined number of sheets is determined to be a number of sheets (such as two or three sheets) considered to be able to be output without increasing the amount of the current in the printing process. Then, when the obtained number of times where the printing process of equal to or less than the predetermined number of sheets is continuously performed is equal to or more than ten, the determination unit 34 determines that the operating status of the main CPU 32 is included in the status ST3 indicated by the status table ST.

The determination unit 34 may be configured to obtain the operating status of the main CPU 32 with a method other than the above-described method, and to determine whether or not the obtained operating status of the main CPU 32 is included in each status indicated by the status table ST.

Detail of Determination by Voltage Comparator 15

The following describes the determination by the voltage comparator 15 in Step S13 in detail. FIG. 8 illustrates a circuit configuration of the voltage comparator 15 in detail. The voltage comparator 15 includes a first comparator 51 and a second comparator 52.

The first comparator 51 includes a non-inverting input terminal (+ terminal) connected to the detecting position of the second DC voltage V2 detected by the detecting unit 35. That is, a second DC voltage V2 identical to the second DC voltage V2, which is detected in Step S12, is input to the non-inverting input terminal of the first comparator 51. A DC voltage VU (hereinafter referred to as an upper limit voltage VU) with an upper limit voltage value larger than the required voltage of the main CPU 32 by the amount of the specified voltage difference is input to an inverting input terminal (− terminal) of the first comparator 51.

On the other hand, a DC voltage VL (hereinafter referred to as a lower limit voltage VL) of a lower limit voltage value that is lower than the required voltage of the main CPU 32 by the amount of the specified voltage difference is input to a non-inverting input terminal (+ terminal) of the second comparator 52. An inverting input terminal (− terminal) of the second comparator 52 is connected to the detecting position of the second DC voltage V2 detected by the detecting unit 35. That is, a second DC voltage V2 identical to the second DC voltage V2 detected in Step S12 is input to the inverting input terminal of the second comparator 52.

In the embodiment, assume that, according to the specification of the SOC 13, the required voltages required by the sub CPU 31 and the main CPU 32 are both determined to 1.1 V. Further, also assume that the voltage difference between the first DC voltage V1 and the second DC voltage V2 is specified to be within 50 mV.

In this case, the specified voltage difference is determined to be 50 mV specified as an upper limit value of the voltage difference between the first DC voltage V1 and the second DC voltage V2. Corresponding to this, the voltage value of the upper limit voltage VU is configured to be the upper limit voltage value of "1.15 V" higher than the required voltage of the main CPU 32 of "1.1 V" by the specified voltage difference of "50 mV." The voltage value of the lower limit voltage VL is configured to be the lower limit voltage value of "1.05 V" lower than the required voltage of the main CPU 32 of "1.1 V" by the specified voltage difference of "50 mV."

Here, assume that, for example, the second DC voltage V2 detected in Step S12 is "1.2 V" that is higher than the upper limit voltage VU of "1.15 V." In this case (V2>VU), the voltage difference of "0.1 V" between the second DC voltage V2 of "1.2 V" and the required voltage of the main CPU 32 of "1.1 V" is greater than the specified voltage difference of "50 mV."

FIG. 9 illustrates a determination result output by the voltage comparator 15. In this case (V2>VU), since the second DC voltage V2 of "1.2 V" input to the non-inverting input terminal is greater than the upper limit voltage VU of "1.15 V" input to the inverting input terminal, the first comparator 51 outputs an output signal O1 (comparison result) of a high (H) level to the voltage adjusting unit 36. On the other hand, since the lower limit voltage VL of "1.05 V" input to the non-inverting input terminal is lower than the second DC voltage V2 of "1.2 V" input to the inverting input terminal, the second comparator 52 outputs an output signal O2 (comparison result) of a low (L) level to the voltage adjusting unit 36.

On the other hand, assume that the second DC voltage V2 detected in Step S12 is "1.0 V" that is equal to or less than the lower limit voltage VL of "1.05 V." In this case (VL≥V2) again, the voltage difference of "0.1 V" between the second DC voltage V2 of "1.0 V" and the required voltage of the main CPU 32 of "1.1 V" is greater than the specified voltage difference of "50 mV." In this case (VL≥V2), the first comparator 51 outputs the output signal O1 of the low level, and the second comparator 52 outputs the output signal O2 of the high level.

Thus, in Step S13, the first and the second comparators 51 and 52 respectively output the output signals O1 and O2 in different levels. This causes the voltage comparator 15 to output the determination result that indicates the voltage difference between the second DC voltage V2 detected in Step S12 and the required voltage of the main CPU 32 is greater than the specified voltage difference.

On the other hand, assume that the second DC voltage V2 detected in Step S2 is "1.12 V" that is greater than the lower limit voltage VL of "1.05 V" and equal to or less than the upper limit voltage VU of "1.15 V." In this case (VU≥V2>VL), the voltage difference of "0.02 V" between the second DC voltage V2 of "1.12 V" and the required voltage of the main CPU 32 of "1.1 V" is equal to or less than the specified voltage difference of "50 mV." In this case (VU≥V2>VL), the first comparator 51 outputs the output signal O1 of the low level, and the second comparator 52 also outputs the output signal O2 of the low level.

Thus, both the first and the second comparators 51 and 52 respectively output the output signals O1 and O2 both of the low level. This causes the voltage comparator 15 to output the determination result that indicates the voltage difference between the second DC voltage V2 detected in Step S12 and the required voltage of the main CPU 32 is equal to or less than the specified voltage difference.

Detail of Adjustment

Figure 10:
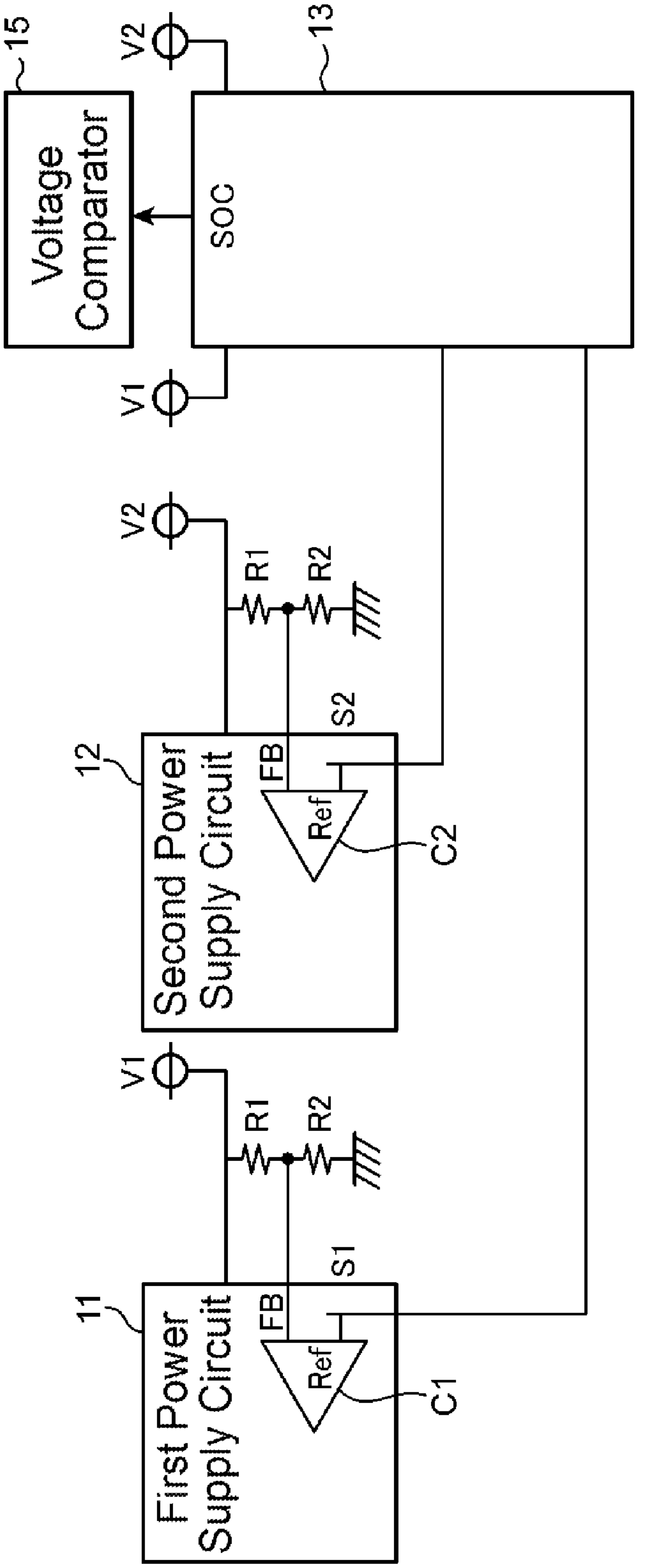
FIG. 10 illustrates a circuit configuration of a first and a second power supply circuit, the SOC, and the voltage comparator.

The following describes the adjustment by the voltage adjusting unit 36 in Step S15 in detail. FIG. 10 illustrates a circuit configuration of the first and the second power supply circuits 11 and 12, the SOC 13, and the voltage comparator 15.

The first power supply circuit 11 includes a comparator C1. The comparator C1 includes one input terminal FB to which the first DC voltage V1 divided by voltage dividing resistors R1 and R2 is input. This feeds back the first DC voltage V1. The comparator C1 includes another input terminal Ref to which the default of the first setting value S1 is input via an I/F 133 of the I2C in the SOC 13. That is, the first setting value S1 is a reference voltage Vref input to the input terminal Ref of the comparator C1.

The first power supply circuit 11 stabilizes the voltage value of the first DC voltage V1 to be output in "(r1+r2)/r2×S1 (r1 and r2 are resistance values of the voltage dividing resistors R1 and R2)" based on the comparison result of the reference voltage Vref and the fed back first DC voltage V1 provided by the comparator C1.

The second power supply circuit 12 includes a comparator C2. The comparator C2 includes one input terminal FB to which the second DC voltage V2 divided by the voltage dividing resistors R1 and R2 is input. This feeds back the second DC voltage V2. The comparator C2 includes another input terminal Ref to which the default of the second setting value S2 is input via the I/F 133 of the I2C in the SOC 13. To the other input terminal Ref of the comparator C2, the second setting value S2 after adjusted by the voltage adjusting unit 36 in Step S15 is also input. That is, the second setting value S2 is a reference voltage Vref input to the input terminal Ref of the comparator C2.

The second power supply circuit 12 stabilizes the voltage value of the second DC voltage V2 to be output in "(r1+r2)/r2×S2 (r1 and r2 are resistance values of the voltage dividing resistors R1 and R2)" based on the comparison result of the reference voltage Vref and the fed back second DC voltage V2 provided by the comparator C2.

In Step S15, the voltage adjusting unit 36 in the SOC 13 regularly repeats a fine adjustment process to adjust the second DC voltage V2 with a predetermined adjustment rate until the determination result input from the voltage comparator 15 indicates the voltage difference to be equal to or less than the specified voltage difference. That is, in Step S15, the voltage adjusting unit 36 regularly repeats the fine adjustment process until both the output signals O1 and O2 of the voltage comparator 15 indicate the low level (FIG. 9).

Specifically, the voltage adjusting unit 36 adjusts the second setting value S2 with the predetermined adjustment rate in the fine adjustment process to input the second setting value S2 after the adjustment to the input terminal Ref of the comparator C2 via the I/F 133. This causes the second power supply circuit 12 to stabilize the voltage value of the second DC voltage V2 to be output in "(r1+r2)/r2×S2 after the adjustment." In this way, the voltage adjusting unit 36 adjusts the second setting value S2 with the predetermined adjustment rate in the fine adjustment process to adjust the second DC voltage V2 with the predetermined adjustment rate.

Concrete Example of Performance of Voltage Regulator

The following describes a concrete example of the performance of the voltage regulator 10. In this concrete example, assume that the adjustment rate used by the voltage adjusting unit 36 in Step S15 is determined to "0.1%." Also assume that the voltage adjusting unit 36 repeats the fine adjustment process "every one minute" (regularly) in Step S15.

Figure 11:
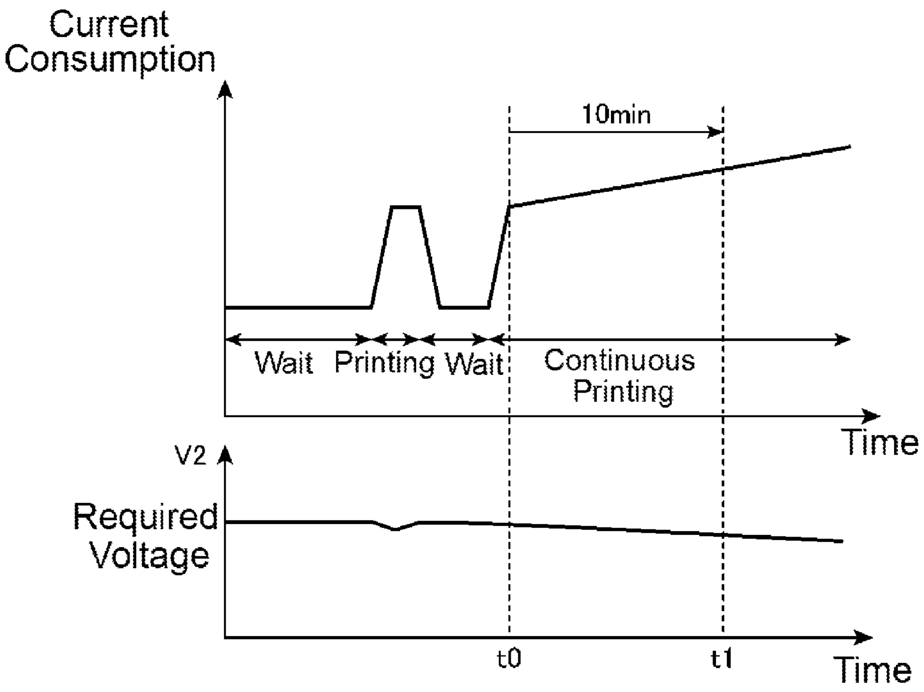
FIG. 11 illustrates a relation between a current consumption on the main CPU and the second DC voltage supplied to the main CPU.

FIG. 11 illustrates a relation between the current consumption on the main CPU 32 and the second DC voltage V2 supplied to the main CPU 32. As illustrated in an upper graph in FIG. 11, assume that, after the voltage regulator 10 is activated, the main CPU 32 waits for a while, and after that, the main CPU 32 executes the printing process once. Then, assume that, after the main CPU 32 waits for a while, the main CPU 32 causes the printing unit 100 to perform the printing process with the required time of equal to or more than 10 minutes.

In this case, the more the processing time of the printing process passes, the more the consumed current amount of the main CPU 32 increases. This generates the above-described IR drop, and as illustrated in a lower graph in FIG. 11, the more the processing time of the printing process passes, the more the second DC voltage V2 supplied to the main CPU 32 decreases.

However, when it comes to a time t1 when 10 minutes passes from a time t0 where the printing process is started, the determination unit 34 determines that the operating status of the main CPU 32 is included in the status ST1 (FIG. 7) indicated by the status table ST in Step S11 (FIG. 6) (YES in Step S11), and the process proceeds to Step S12. Then, assume that the second DC voltage V2 detected in Step S12 is "1.048 V" smaller than the lower limit voltage VL of "1.05 V."

Figure 12:
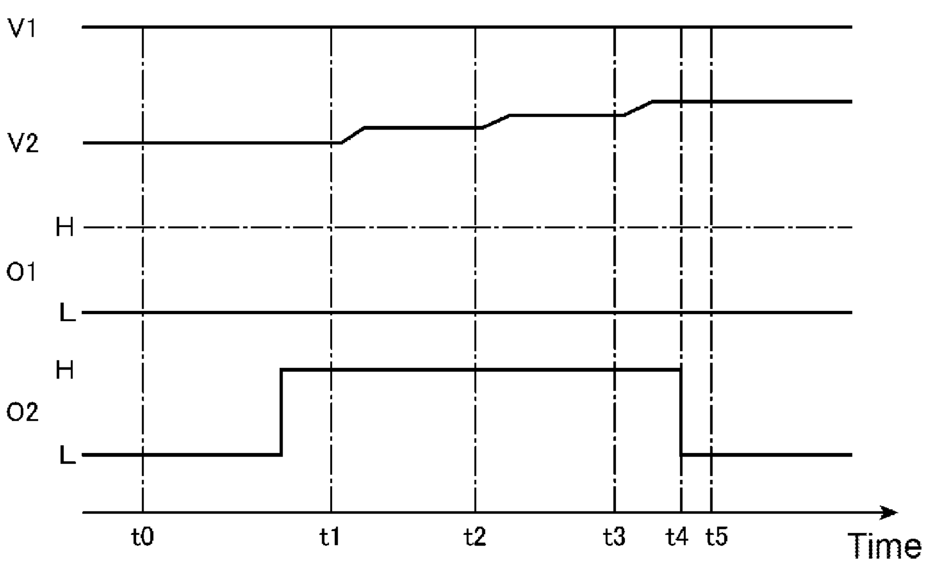
FIG. 12 illustrates waveforms of output signals of a first and a second comparators included in the voltage comparator, and waveforms of the first and the second DC voltages.

FIG. 12 illustrates waveforms of the output signals O1 and O2 of the first and the second comparators 51 and 52 included in the voltage comparator 15, and waveforms of the first and the second DC voltages V1 and V2. In this case (VL≥V2), in Step S13, the first and the second comparators 51 and 52 output the output signal O1 of the low level and the output signal O2 of the high level respectively (time t1 in FIG. 9 and FIG. 12). That is, in Step S13, the voltage comparator 15 outputs the determination result indicating the voltage difference to be greater than the specified voltage difference to the voltage adjusting unit 36 (NO in Step S13).

In this case, the voltage adjusting unit 36 advances the process to Step S14. Then, the voltage adjusting unit 36 determines that the termination condition is not satisfied because Step S15 has never been performed (NO in Step S14). Then, the process proceeds to Step S15. Then, in Step S15, the voltage adjusting unit 36 repeats the fine adjustment process every one minutes until both the output signals O1 and O2 of the first and the second comparators 51 and 52 indicates the low level (times t1, t2, and t3 in FIG. 12).

At the times t1, t2, and t3, the output signal O2 is the high level, and as illustrated in FIG. 9, the second DC voltage V2 is indicated to be smaller than the lower limit voltage VL (VL≥V2). Accordingly, in each fine adjustment process at the times t1, t2, and t3, the voltage adjusting unit 36 adjusts the second setting value S2 to increase by the predetermined adjustment rate of "0.1%" (the adjustment to increase S2 to 1.001 times).

In this concrete example, at the times t1, t2, and t3, the second DC voltage V2 increases in phases of "1.049 (≅1.048×1.01)," "1.050 (≈square of 1.048×1.01)," and "1.051 (≈third power of 1.048×1.01)."

Then, assume that, at a time t4, the second DC voltage V2 exceeds the lower limit voltage VL, and the voltage difference between the second DC voltage V2 and the required voltage of the main CPU 32 is decreased to equal to or less than the specified voltage difference. At this time, both the output signals O1 and O2 of the first and the second comparators 51 and 52 indicate the low level.

When both the output signals O1 and O2 of the first and the second comparators 51 and 52 indicate the low level at the time t4, the voltage adjusting unit 36 terminates Step S15 and returns the process to Step S11.

Then, assume that, at a time t5, the main CPU 32 causes the printing unit 100 to perform such as a printing process that uses image data with the data amount of 15 M. Then, assume that the determination unit 34 determines the operating status of the main CPU 32 to be included in the status ST2 indicated by the status table ST (FIG. 7) (YES in Step S11), and the process proceeds to Step S12.

In this case, since the fine adjustment process is performed at the times t1, t2, and t3, the second DC voltage V2 detected in Step S12 is "1.051 V" that is greater than the lower limit voltage VL of "1.05 V" and equal to or less than the upper limit voltage VU of "1.15 V."

Accordingly, in Step S13, the voltage comparator 15 uses the first and the second comparators 51 and 52 to output the output signals O1 and O2 both of the low level (time t5 in FIG. 9 and FIG. 12). In this case, since both the output signals O1 and O2 indicate the low level and the voltage difference indicates to be equal to or less than the specified voltage difference, the voltage adjusting unit 36 returns the process to Step S11.

Summary of Embodiment (1) When the operating status of the main CPU 32 is under the predetermined status to increase the current consumption of the main CPU 32, the voltage regulator 10 adjusts the second DC voltage V2 such that the voltage difference between the second DC voltage V2 and the required voltage of the sub CPU 31, which is equal to the required voltage of the main CPU 32, is equal to or less than the specified voltage difference.

This causes the operating status of the main CPU 32 to be under the predetermined status to increase the current consumption of the main CPU 32. Then, even if the second DC voltage V2 supplied to the main CPU 32 decreases, the possibility that the voltage difference between the second DC voltage V2 and the first DC voltage V1, which is considered to be close to the required voltage of the sub CPU 31, exceeds the specified voltage difference can be reduced.

That is, when there is a specification that the required voltages of the main CPU 32 and the sub CPU 31 should be equal and the voltage difference between the first DC voltage V1 and the second DC voltage V2 should be equal to or less than the specified voltage difference, the possibility to violate the specification can be reduced.

(2) The voltage regulator 10 regularly repeats the adjustment of the second DC voltage V2 with the predetermined adjustment rate. This ensures the second DC voltage V2 to be adjusted in phases. Accordingly, the possibility that the second DC voltage V2 supplied to the main CPU 32 rapidly varies to cause the malfunction of the main CPU 32 during the operation of the main CPU 32 can be reduced.

(3) The voltage regulator 10 determines whether or not the operating status of the main CPU 32 is under the predetermined status to increase the current consumption of the main CPU 32 based on whether or not the operating status of the main CPU 32 is included in the predetermined statuses ST1 to ST3 to increase the current consumption of the main CPU 32, which are indicated by the status table ST stored in the memory 14. This ensures to perform the determination with a simple configuration without a complicated configuration where the consumed current amount of the main CPU 32 is measured to determine whether or not the operating status of the main CPU 32 is the status to increase the current consumption of the main CPU 32 based on the measured consumed current amount of the main CPU 32 and the predetermined threshold.

(4) When the output signal O1 output by the first comparator 51 indicates the second DC voltage V2 to be equal to or less than the upper limit voltage VU (low level), and the output signal O2 output by the second comparator 52 indicates the second DC voltage V2 to be equal to or more than the lower limit voltage LU (low level), the voltage difference between the second DC voltage V2 and the required voltage of the main CPU 32 is equal to or less than the specified voltage difference.

This ensures the voltage adjusting unit 36 to rapidly determine whether or not the voltage difference between the second DC voltage V2 and the required voltage of the main CPU 32 is equal to or less than the specified voltage difference based on the output signals O1 and O2 output from the first comparator 51 and the second comparator 52, when the voltage adjusting unit 36 adjusts the second DC voltage V2.

(5) Assume that the operating status of the main CPU 32 is under the status to increase the current consumption of the main CPU 32, and the IR drop is generated in the power feeder that supplies the second DC voltage V2 from the second power supply circuit 12 to the main CPU 32. In this case, the second DC voltage V2 immediately before input to the main CPU 32 is decreased compared with the second DC voltage V2 immediately after output from the second power supply circuit 12.

Since the voltage regulator 10 detects the second DC voltage V2 on the position close to the main CPU 32, the voltage regulator 10 ensures to detect the voltage close to the second DC voltage V2 actually supplied to the main CPU 32 compared with the second DC voltage V2 detected on the position close to the second power supply circuit 12. This ensures to adjust the second DC voltage V2 actually supplied to the main CPU 32 with high accuracy compared with the case where the second DC voltage V2 is adjusted based on the second DC voltage V2 detected on the position close to the second power supply circuit 12.

Modifications

The embodiments described above are merely exemplary embodiments according to the disclosure, and it is not intended to limit the disclosure to the embodiments described above. For example, the following modified embodiments may be possible.

(1) For the convenience of the wiring, the detecting unit 35 may be configured to detect the second DC voltage V2 on a position close to the second power supply circuit 12 compared with to the main CPU 32.

(2) The voltage regulator 10 may be configured without the voltage comparator 15, and configured such that the voltage adjusting unit 36 calculates the voltage difference between the second DC voltage V2 detected in Step S12 and the required voltage of the main CPU 32 to determine whether or not the calculated voltage difference is equal to or less than the specified voltage difference in Step S13.

(3) The memory 14 may be configured not to store the status table ST. Corresponding to this, the main CPU 32 may be configured to output a signal that indicates to perform a predetermined operation to increase the current consumption of the main CPU 32 to the determination unit 34 when the main CPU 32 performs the operation. Then, the determination unit 34 may be configured to determine the operating status of the main CPU 32 to become under the predetermined status to increase the current consumption of the main CPU 32 when the signal is input.

Alternatively, the voltage regulator 10 may be configured to include a measurement circuit to measure the consumed current amount in the main CPU 32 while the memory 14 is configured not to store the status table ST. Then, the determination unit 34 may be configured to determine the operating status of the main CPU 32 to come under the predetermined status to increase the current consumption of the main CPU 32 when the consumed current amount measured by the measurement circuit exceeds the predetermined threshold.

(4) Instead of the process where the voltage adjusting unit 36 regularly repeats the fine adjustment process in Step S15, the voltage adjusting unit 36 may be configured to adjust the second DC voltage V2 only once such that the voltage difference between the second DC voltage V2 detected by the detecting unit 35 in Step S12 and the required voltage of the main CPU 32 is equal to or less than the specified voltage difference.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A voltage regulator operating in normal and power-saving modes, the voltage regulator comprising:

an integrated circuit including a first core through which passage of current is continued in the power-saving mode, and a second core through which passage of current is halted in the power-saving mode;

a first power supply circuit that generates a first DC voltage supplied to the first core; and a second power supply circuit that generates a second DC voltage supplied to the second core; wherein a required voltage of the second core is established to be equal to a required voltage of the first core, and the integrated circuit includes a determination unit that determines whether operational status of the second core is a predetermined state that increases consumed current of the second core;

a detecting unit that detects the second DC voltage output from the second power supply circuit when the determination unit determines the operational status of the second core to be the predetermined state; and a voltage adjusting unit that adjusts the second DC voltage such that difference in voltage between the detected second DC voltage and the required voltage of the second core is equal to or less than a predetermined specified voltage difference.

2. The voltage regulator according to claim 1, wherein the voltage adjusting unit regularly repeats to adjust the second DC voltage with a predetermined adjustment rate until the voltage difference is decreased to equal to or less than the predetermined specified voltage difference.

3. The voltage regulator according to claim 1, further comprising:

a storage unit storing status information, the status information indicating the predetermined statuses; wherein in the determination, the determination unit determines whether or not the operating status of the second core is included in the predetermined statuses indicated by the status information.

4. The voltage regulator according to claim 1, further comprising:

a first comparator that outputs a comparison result of an upper limit voltage value and the detected second DC voltage to the voltage adjusting unit, the upper limit voltage value being higher than the required voltage of the second core by the predetermined specified voltage difference; and a second comparator that outputs a comparison result of a lower limit voltage value and the detected second DC voltage to the voltage adjusting unit, the lower limit voltage value being lower than the required voltage of the second core by the predetermined specified voltage difference.

5. The voltage regulator according to claim 1, wherein the detecting unit detects the second DC voltage at a position close to the second core compared with the second power supply circuit.

6. An image forming apparatus comprising a voltage regulator that comprises:

an integrated circuit including a first core through which passage of current is continued in the power-saving mode, and a second core through which passage of current is halted in the power-saving mode;

a first power supply circuit that generates a first DC voltage supplied to the first core; and a second power supply circuit that generates a second DC voltage supplied to the second core; wherein a required voltage of the second core is established to be equal to a required voltage of the first core, and the integrated circuit includes a determination unit that determines whether operational status of the second core is a predetermined state that increases consumed current of the second core;

a detecting unit that detects the second DC voltage output from the second power supply circuit when the determination unit determines the operational status of the second core to be the predetermined state; and a voltage adjusting unit that adjusts the second DC voltage such that difference in voltage between the detected second DC voltage and the required voltage of the second core is equal to or less than a predetermined specified voltage difference.

* * * * *